US012512652B2

(12) United States Patent
Ueta et al.

(10) Patent No.: US 12,512,652 B2
(45) Date of Patent: Dec. 30, 2025

(54) WIRE HARNESS

(71) Applicant: YAZAKI CORPORATION, Tokyo (JP)

(72) Inventors: Yusuke Ueta, Makinohara (JP); Yoshinao Sato, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 147 days.

(21) Appl. No.: 18/646,758

(22) Filed: Apr. 26, 2024

(65) Prior Publication Data

US 2024/0297486 A1 Sep. 5, 2024

Related U.S. Application Data

(63) Continuation of application No. PCT/JP2023/004695, filed on Feb. 13, 2023.

(30) Foreign Application Priority Data

Feb. 16, 2022 (JP) ................................ 2022-021924

(51) Int. Cl.
*H02G 3/04* (2006.01)
*H01B 7/00* (2006.01)
*H02G 3/22* (2006.01)

(52) U.S. Cl.
CPC ......... *H02G 3/0481* (2013.01); *H01B 7/0045* (2013.01); *H02G 3/22* (2013.01)

(58) Field of Classification Search
CPC ...... H02G 3/0481; H02G 3/22; H01B 7/0045; H01B 13/6581; H01B 13/6592; H01B 13/74
See application file for complete search history.

(56) References Cited

U.S. PATENT DOCUMENTS 6,280,208 B1 8/2001 Masuda et al.
2012/0190238 A1* 7/2012 Omae ................ H01R 13/6592 439/620.01
(Continued)

FOREIGN PATENT DOCUMENTS

CN 108539447 A 9/2018
JP 2000-294344 A 10/2000
(Continued)

OTHER PUBLICATIONS

International Search Report for PCT/JP2023/004695 dated Apr. 18, 2023.

*Primary Examiner* — Paresh Paghadal
(74) *Attorney, Agent, or Firm* — KENEALY VAIDYA LLP

(57) ABSTRACT

A wire harness including: a shielded wire; a metal housing having a tubular body serving as a wire insertion path and being inserted into an outer wall body in a metal shield case, and a fixed part causing the tubular body to be fixed to the outer wall body; a tubular shield terminal being connected to a shield material; and an annular seal member disposed in the wire insertion path to fill an annular gap between the tubular body and the shielded wire, in which the shield terminal includes: a press-fitting part being press-fitted and fixed to the tubular body at a position farther on an interior side of the shield case than the seal member in the wire insertion path; and a locking part being locked to a locked part of the tubular body farther on the interior side of the shield case than the seal member.

3 Claims, 9 Drawing Sheets

(56) References Cited

U.S. PATENT DOCUMENTS

| | | | | |
|---|---|---|---|---|
| 2013/0084728 | A1 | 4/2013 | Omae et al. | |
| 2015/0140850 | A1 | 5/2015 | Suzuki et al. | |
| 2015/0170851 | A1* | 6/2015 | Muro | H01H 13/04 200/295 |
| 2016/0134093 | A1 | 5/2016 | Albert et al. | |
| 2022/0094108 | A1* | 3/2022 | Watanabe | H01R 4/28 |

FOREIGN PATENT DOCUMENTS

| | | | |
|---|---|---|---|
| JP | 2002-260773 | A | 9/2002 |
| JP | 2012-54145 | A | 3/2012 |
| JP | 2014-26761 | A | 2/2014 |

* cited by examiner

WIRE HARNESS

CROSS-REFERENCE TO RELATED APPLICATION(S)

This application is a continuation application of International Application No. PCT/JP2023/004695 filed on Feb. 13, 2023 which claims the benefit of priority from Japanese Patent Application No. 2022-021924 filed on Feb. 16, 2022 and designating the U.S., the entire contents of which are incorporated herein by reference.

BACKGROUND OF THE INVENTION

1. Field of the Invention

The present invention relates to a wire harness.

2. Description of the Related Art

Conventionally, as a wire harness, a wire harness in which a shield connector is assembled to a shielded wire passing through a through hole of a shield case is known. The shield connector includes a housing with a flange through which a shielded wire is inserted, and a shield terminal that electrically connects a shield material (braid or the like) of the shielded wire to a metal shield case. In this shield connector, a part of the shield terminal is sandwiched between the flange of the housing and an outer wall body of the shield case, and these are fastened and fixed together to electrically connect the shield material to the shield case via the shield terminal. This type of wire harness is disclosed in, for example, Japanese Patent Application Laid-open No. 2000-294344 A.

Here, in the shield connector, the housing is formed of the same metal material as that of the shield case, but in some cases, the shield terminal is formed of a dissimilar metal material having an ionization tendency different from that of the shield case. In such a shield connector, when water or an electrolyte solution enters between the shield terminal and the shield case, galvanic corrosion occurs in one of the shield terminal and the shield case having a higher ionization tendency, and when the corrosion progresses, there is a possibility that the two is fixed to each other. Therefore, in this shield connector, when the galvanic corrosion occurs, there is a risk that the shielding performance is deteriorated at the corroded portion. For this reason, in a conventional shield connector, there is a shield connector in which a shield terminal is press-fitted into a housing and the shield terminal is not brought into direct contact with a shield case to prevent contact between dissimilar metals (Japanese Patent Application Laid-open No. 2002-260773 A).

Incidentally, in the conventional shield connector, because the shield terminal is fixed to the housing only by the press-fitting structure, there is a possibility that the holding force between the housing and the shield terminal is lowered with aging or the like.

SUMMARY OF THE INVENTION

Therefore, an object of the present invention is to provide a wire harness that can prevent contact for a long time between dissimilar metals of a shield connector at a place exposed to liquid such as water.

Solution to Problem

In order to achieve the above mentioned object, a wire harness according to one aspect of the present invention include a shielded wire provided with a shield material containing metal; a housing containing metal, the housing having a tubular body that serves as a wire insertion path through which the shielded wire is inserted and is inserted into a through hole of an outer wall body in a shield case containing metal, and a fixed part that causes the tubular body to be fixed to the outer wall body; a shield terminal having a tubular shape, the shield terminal being physically and electrically connected to the shield material; and a seal member having an annular shape, the seal member being disposed in the wire insertion path to fill a gap having an annular shape and provided between an inner peripheral surface of the tubular body and an outer peripheral surface of the shielded wire, and preventing liquid that has entered the wire insertion path from an outside of the shield case from entering into an interior of the shield case through the gap, wherein the shield terminal includes a press-fitting part that is press-fitted and fixed to the tubular body at a press-fitting completion position farther on an interior side of the shield case than the seal member in the wire insertion path, and a locking part that causes the shield terminal to be locked to a locked part of the tubular body farther on the interior side of the shield case than the seal member in the wire insertion path while being at the press-fitting completion position.

The above and other objects, features, advantages and technical and industrial significance of this invention will be better understood by reading the following detailed description of presently preferred embodiments of the invention, when considered in connection with the accompanying drawings.

DESCRIPTION OF EMBODIMENTS

Detailed Description of the Preferred Embodiments

Figure 1:
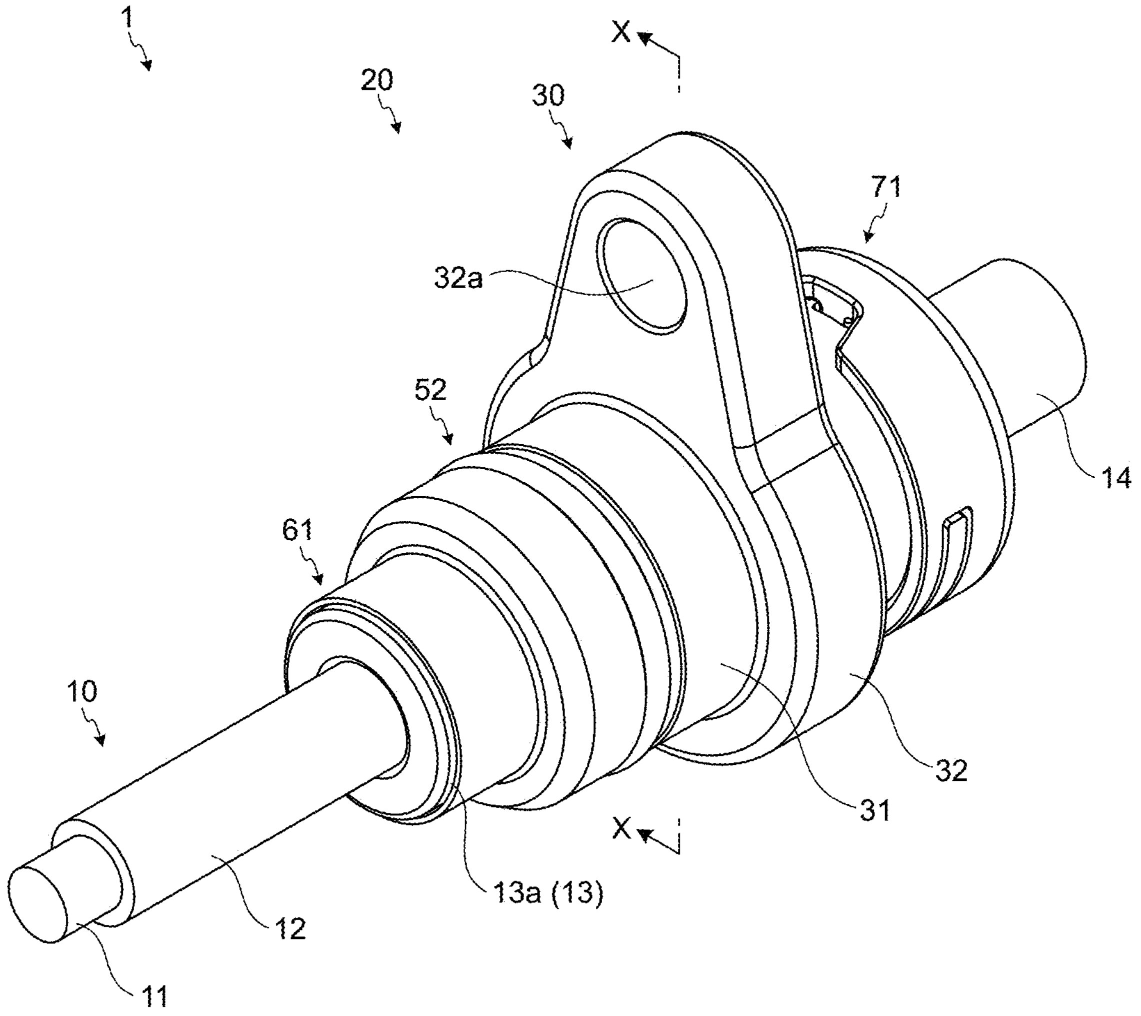
FIG. 1 is a perspective view illustrating a wire harness according to an embodiment.

Hereinafter, an embodiment of a wire harness according to the present invention will be described in detail with reference to the drawings. Note that the present invention is not limited by the embodiment.

Embodiment

One embodiment of the wire harness according to the present invention will be described in detail with reference to FIGS. 1 to 9.

Reference numeral 1 in FIGS. 1 to 5 denotes a wire harness of the present embodiment. The wire harness 1 includes a shielded wire 10 and a shield connector 20 which are assembled to each other.

Figure 2:
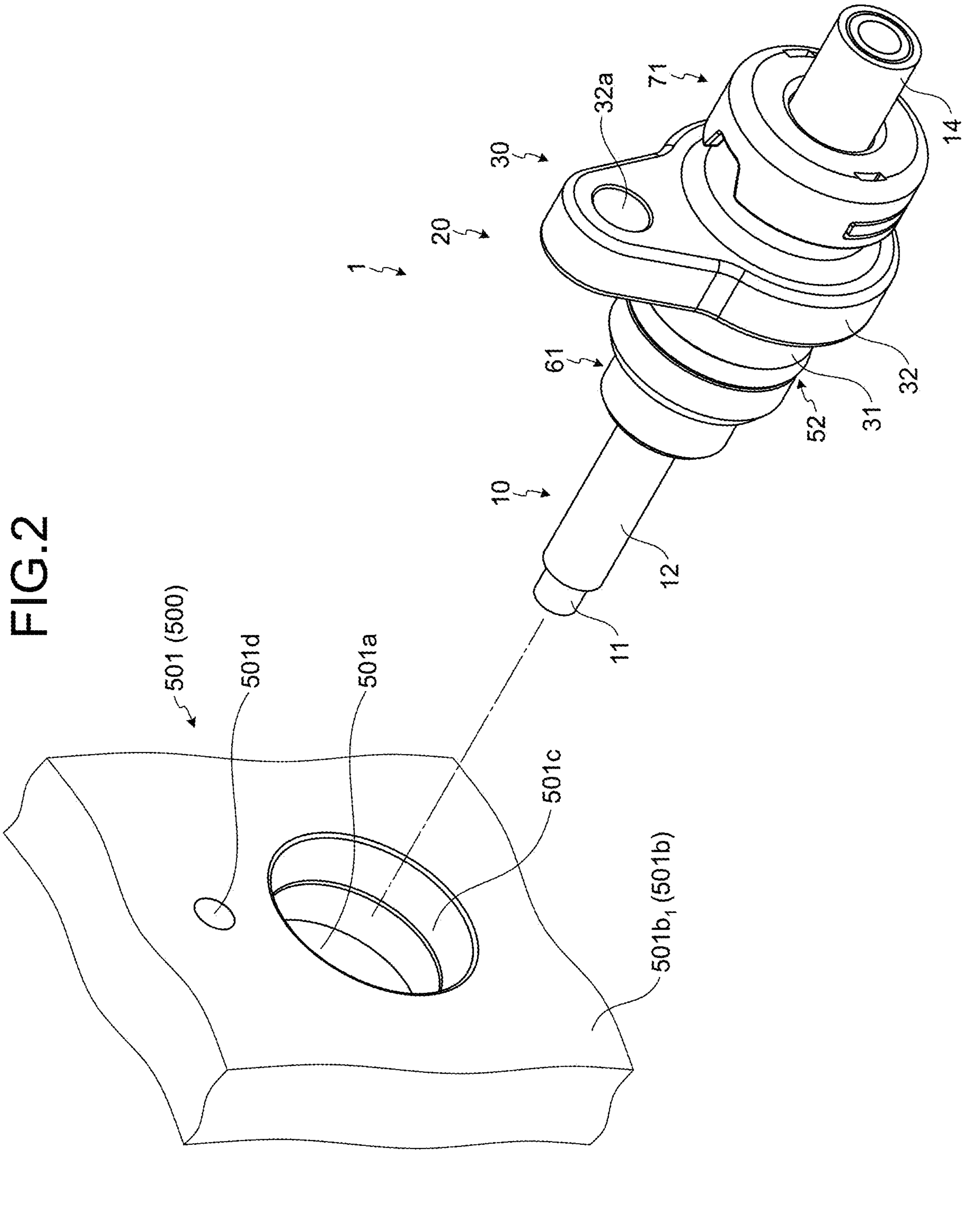
FIG. 2 is a perspective view of the wire harness according to the embodiment as viewed from another angle together with a shield case before assembling.
Figure 3:
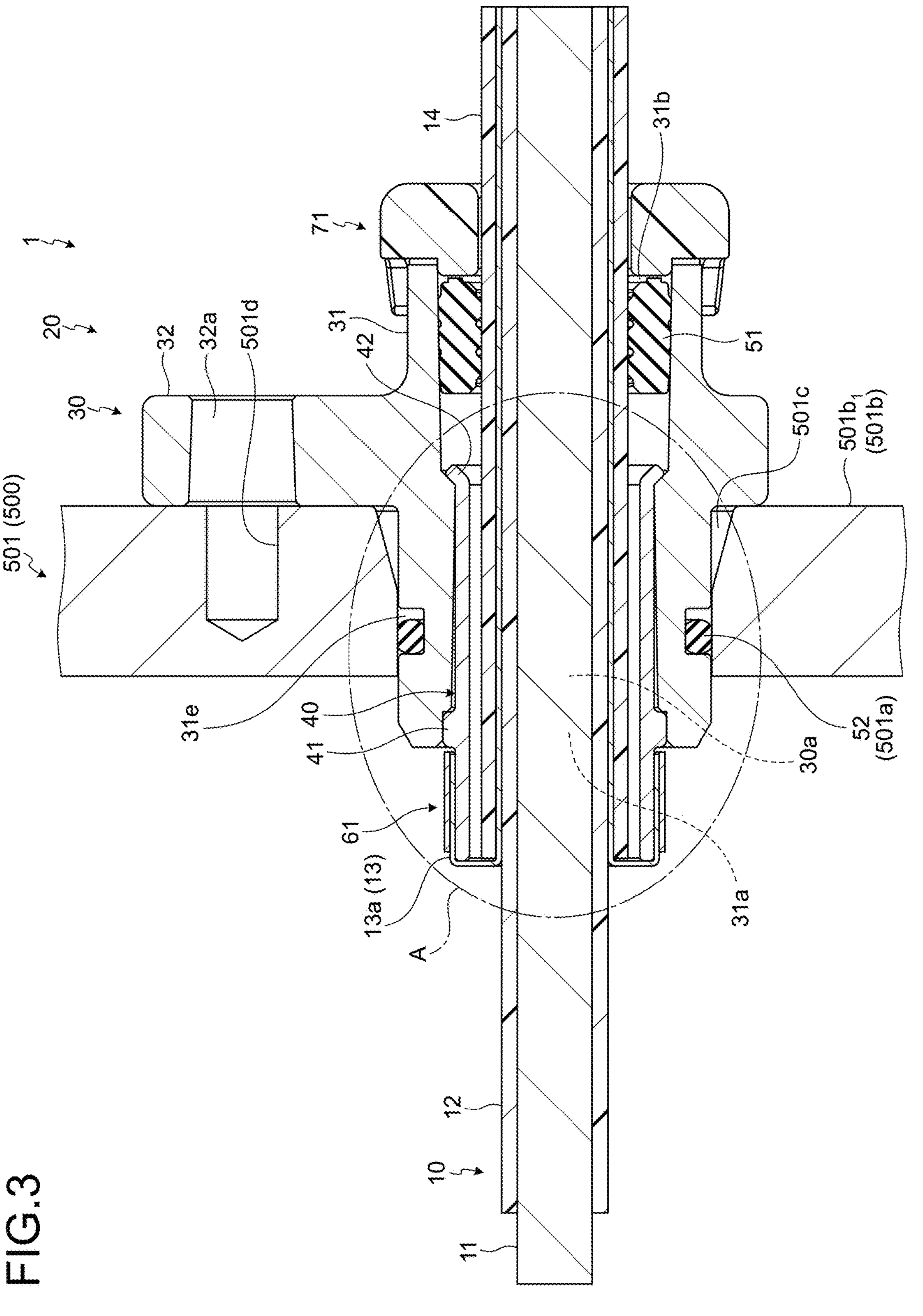
FIG. 3 is a cross-sectional view taken along a line X-X in FIG. 1.

The wire harness 1 is provided, for example, for electrically connecting an electric device (for example, a rotary machine or an inverter) 500 of a vehicle to another electric device (not illustrated) of a vehicle or the like, and is attached to a metal housing (hereinafter, referred to as a "shield case") 501 of the electric device 500 (FIGS. 2 and 3). The shielded wire 10 is electrically connected to a device body (not illustrated) in an interior 501*a* of the shield case 501, passes through a through hole 501*c* of an outer wall body (hereinafter, referred to as a "shield wall") 501*b* of the shield case 501, and is pulled out from the interior 501*a* to the outside of the shield case 501 (FIGS. 2 and 3). The shield connector 20 is fixed to the shield wall 501*b* outside the shield case 501 while having the shielded wire 10 inserted therein to suppress, for example, intrusion of noise from the through hole 501*c* into the interior 501*a* of the shield case 501.

The shielded wire 10 includes a columnar conductive core wire 11, a cylindrical insulating inner coating (inner sheath) 12 concentrically covering the core wire 11, a cylindrical conductive shield material 13 concentrically covering the inner sheath 12, and a cylindrical insulating outer coating (outer sheath) 14 concentrically covering the shield material 13 (FIGS. 1 to 3 and 5).

The core wire 11 and the shield material 13 are formed of a metal material. For example, the core wire 11 may be formed of one columnar metal linear conductor, or may be formed by bundling a plurality of metal linear conductors as one columnar conductor by twisting the plurality of metal linear conductors. In addition, the shield material 13 is provided to suppress intrusion of noise into the core wire 11. For example, the shield material 13 may be a braided body obtained by braiding a metal linear conductor in a mesh shape and a cylindrical shape, or may be a metal foil material (so-called metal foil) formed in a cylindrical shape.

The shield connector 20 includes a metal housing 30 through which the shielded wire 10 is inserted (FIGS. 1 to 5). Furthermore, the shield connector 20 includes a shield terminal 40 that electrically connects the shield material 13 of the shielded wire 10 to the shield case 501 and releases the noise propagating through the shield material 13 from the shield case 501 to a vehicle body (FIGS. 1 to 5).

The housing 30 has a tubular body 31 whose inside serves as a wire insertion path 30*a* through which the shielded wire 10 is inserted and which is inserted into the circular through hole 501*c* of the shield wall 501*b* (FIGS. 1 to 8). Furthermore, the housing 30 includes a fixed part 32 that causes the tubular body 31 to be fixed to an outer wall surface $\mathbf{501}b_1$ of the shield wall 501*b* (FIGS. 1 to 3 and FIGS. 5 to 8).

The tubular body 31 causes the shielded wire 10 in the inside thereof to be routed between the interior 501*a* and the outside of the shield case 501 via the through hole 501*c*. The tubular body 31 has a first opening 31*a* at one end in a tube axis direction and a second opening 31*b* at the other end in the tube axis direction (FIGS. 3 and 5 to 8). In the tubular body 31, the first opening 31*a* is disposed on the interior 501*a* side of the shield case 501, and the second opening 31*b* is disposed on the outer side of the shield case 501. Here, the through hole 501*c* of the shield wall 501*b* is formed in a circular shape, and the tubular body 31 is formed in a cylindrical shape.

The fixed part 32 is a flat plate-shaped flange part having a water droplet shape (so-called teardrop shape) in which a small diameter part and a large diameter part are connected on the same plane. The large-diameter part of the fixed part 32 is formed to have an outer diameter larger than that of the tubular body 31, and the large-diameter part is concentrically disposed in the middle of the tube axis of the tubular body 31. In the fixed part 32, a through hole 32*a* is formed in a small diameter part (FIGS. 1 to 3 and 5). The fixed part 32 is fixed to the outer wall surface $\mathbf{501}b_1$ of the shield wall 501*b* by screwing a male screw member (not illustrated) passing through the through hole 32*a* into a female screw part 501*d* of the shield wall 501*b* (FIGS. 2 and 3).

In the housing 30, the tubular body 31 is inserted into the through hole 501*c* of the shield wall 501*b* from the first opening 31*a* side, and screwed and fixed to the shield wall 501*b* at a position where the plane of the fixed part 32 abuts on the outer wall surface $\mathbf{501}b_1$ of the shield wall 501*b*. Therefore, a portion of the tubular body 31 farther on the first opening 31*a* side than the fixed part 32 is inserted into the through hole 501*c*. Therefore, the tubular body 31 is formed in a cylindrical shape having an outer diameter smaller than an inner diameter of the through hole 501*c* of the shield wall 501*b* (FIG. 3).

Figure 4:
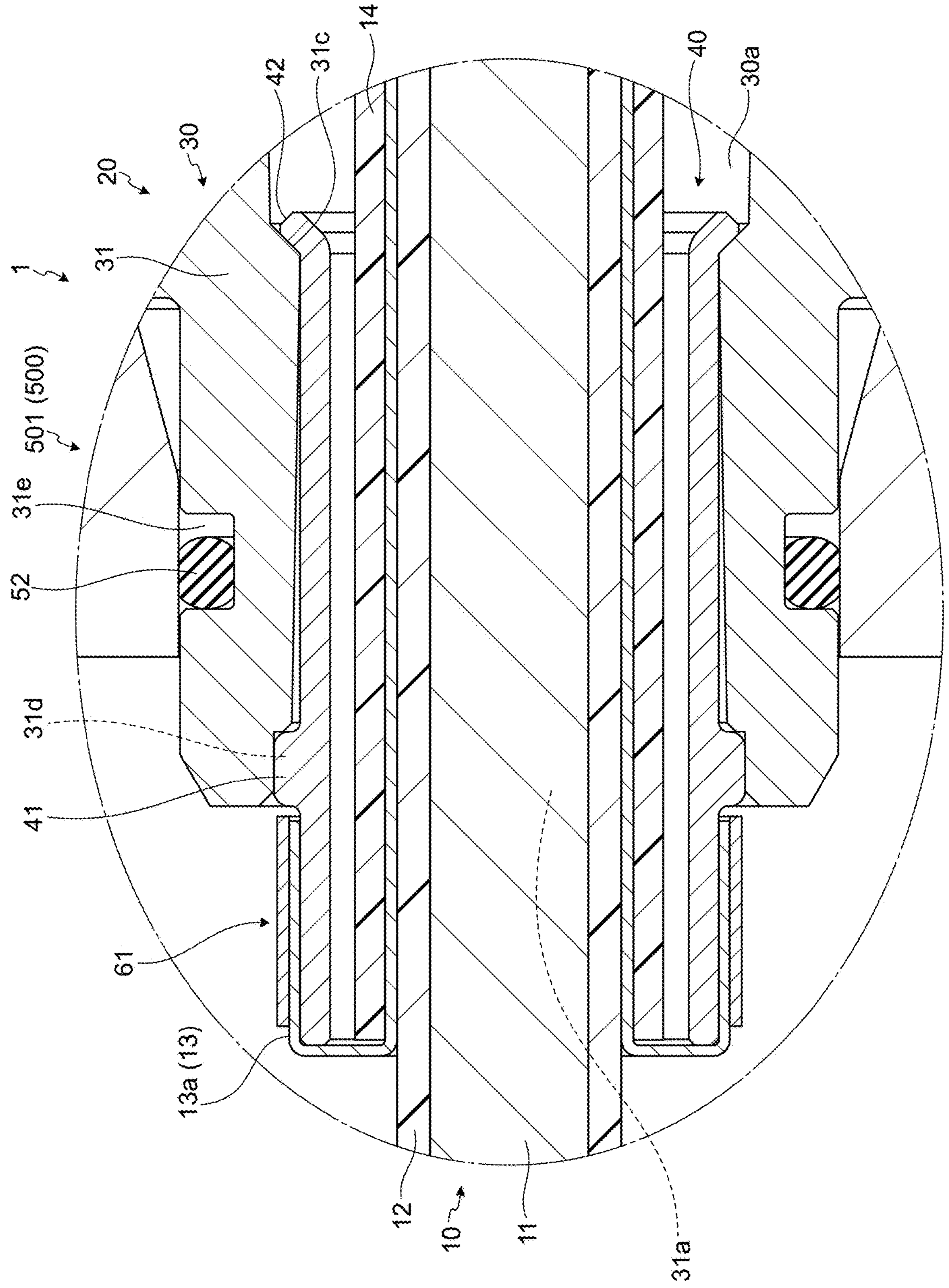
FIG. 4 is an enlarged view of a portion A in FIG. 3.

The shield terminal 40 is formed of a metal material. The shield terminal 40 indirectly electrically connects the shield material 13 of the shielded wire 10 to the shield case 501. Therefore, the shield terminal 40 is electrically connected directly to the shield material 13 of the shielded wire 10 by being physically and electrically connected to at least the shield material 13 (FIGS. 3 and 4).

Figure 5:
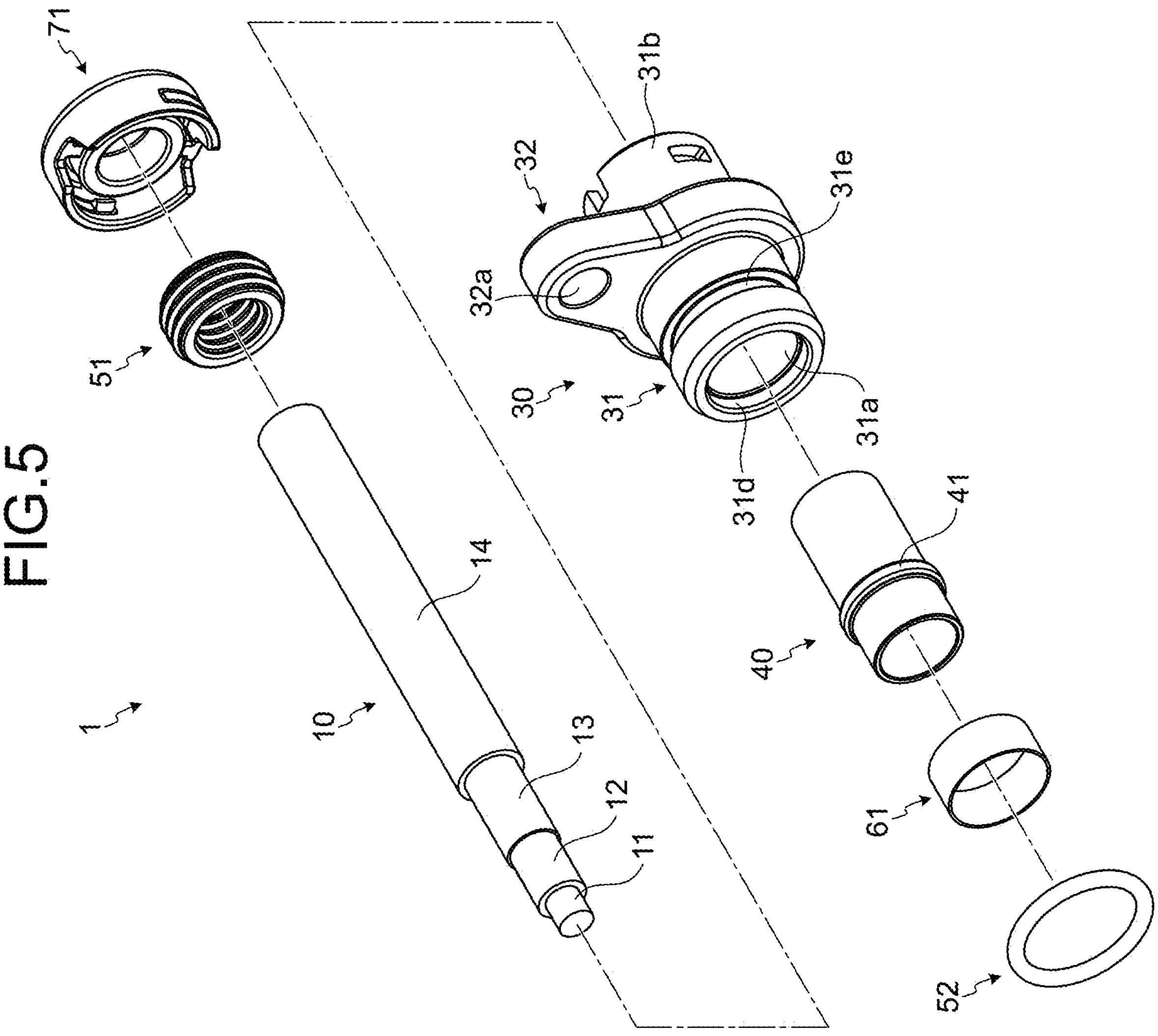
FIG. 5 is an exploded perspective view illustrating the wire harness according to the embodiment.

Meanwhile, the shield terminal 40 is molded in a tubular shape and is disposed in the wire insertion path 30*a*. The shield terminal 40 is electrically connected indirectly to the shield case 501 via the housing 30 by being physically and electrically connected to the housing 30 in the wire insertion path 30*a*. For this reason, the shield terminal 40 is physically and electrically connected to the housing 30 at a place not exposed to water or an electrolyte solution that has entered the wire insertion path 30*a* from the outside of the shield case 501. For example, the housing 30 forms an annular gap between the inner peripheral surface of the tubular body 31 and the outer peripheral surface of the shielded wire 10 in the wire insertion path 30*a*. Therefore, in the housing 30, when liquid such as water outside the shield case 501 enters the wire insertion path 30*a* from the second opening 31*b*, there is a possibility that the liquid flows to the first opening 31*a* side through a gap between the inner peripheral surface of the tubular body 31 and the outer peripheral surface of the shielded wire 10. Therefore, the shield connector 20 includes an annular seal member (hereinafter, referred to as a "first seal member") 51 that prevents liquid that has entered the wire insertion path 30*a* from the outside of the shield case 501 from entering into the interior 501*a* of the shield case 501 via the gap (FIGS. 3 and 5). Therefore, a portion of the shield connector 20 farther on the interior 501*a* side of the shield case 501 than the first seal member 51 becomes a place not exposed to the liquid that has entered the wire insertion path 30*a* from the outside of the shield case 501. The shield terminal 40 is physically and electrically connected to the tubular body 31 at a portion farther on the interior 501*a* side of the shield case 501 than the first seal member 51 (FIGS. 3 and 4).

The first seal member 51 is disposed in the wire insertion path 30*a* to fill the annular gap between the inner peripheral surface of the tubular body 31 and the outer peripheral surface of the shielded wire 10 (outer peripheral surface of the outer coating 14). The first seal member 51 is an annular waterproof member to be inserted into the wire insertion path 30*a* from the second opening 31*b* together with the shielded wire 10, and fills the annular gap between the inner peripheral surface of the tubular body 31 and the outer peripheral surface of the shielded wire 10 to enhance waterproofness (FIGS. 3 and 5).

As described above, in the shield connector 20, even when liquid such as water enters the wire insertion path 30*a* from the outside of the shield case 501, the liquid is made difficult to enter a portion farther on the interior 501*a* side of the shield case 501 than the first seal member 51. In the shield connector 20, the shield terminal 40 is physically and electrically connected to the housing 30 and the shield terminal 40 is indirectly and electrically connected to the shield case 501 via the housing 30 at a place where liquid such as water that has entered the wire insertion path 30*a* from the outside of the shield case 501 is difficult to enter by the first seal member 51. Therefore, in the shield connector 20, even if the housing 30 is formed of a metal material having the same ionization tendency as the shield case 501, and the shield terminal 40 is formed of another metal material having a different ionization tendency from the housing 30 and the shield case 501, the contact between the shield terminal 40 and the housing 30 is the contact between dissimilar metals at a place where liquid such as water does not enter. Therefore, the shield connector 20 can suppress the occurrence of galvanic corrosion between the shield terminal 40 and the housing 30 and between the shield terminal 40 and the shield case 501. For example, the housing 30 and the shield case 501 are formed of aluminum or an aluminum alloy. The shield terminal 40 is formed of copper or a copper alloy.

Specifically, the shield terminal 40 is press-fitted and fixed to the tubular body 31 in the wire insertion path 30*a*, and is locked to the tubular body 31 at a place different from the press-fitting and fixing portion. The shield terminal 40 includes a press-fitting part 41 that is press-fitted and fixed to the tubular body 31 at a press-fitting completion position farther on the interior 501*a* side of the shield case 501 than the first seal member 51 in the wire insertion path 30*a*, and a locking part 42 that is locked to a locked part 31*c* of the tubular body 31 farther on the interior 501*a* side of the shield case 501 than the first seal member 51 in the wire insertion path 30*a* while being at the press-fitting completion position (FIGS. 3 and 4). The shield terminal 40 is physically and electrically connected to the tubular body 31 at least at a place where the press-fitting part 41 is in contact with the tubular body 31. In the shield terminal 40, the locked part 31*c* and the locking part 42 are always in contact with each other by the locking structure of the locked part 31*c* and the locking part 42. Therefore, in the locking structure in the constant contact state, the shield terminal is physically and electrically connected to the tubular body 31 even at a place where the locked part 31*c* and the locking part 42 are in contact with each other.

The press-fitting part 41 is formed as a protruding part protruding annularly from the outer peripheral surface of the shield terminal 40 over the circumferential direction (FIGS. 3 to 8). The press-fitting part 41 illustrated here is an annular protruding part formed as if by being laminated on the outer peripheral surface of the shield terminal 40, and is formed in an annular shape concentric with the shield terminal 40.

The tubular body 31 has an annular groove 31*d* into which the press-fitting press-fitting part 41 is fitted and press-fitted and fixed (FIGS. 4 to 8). The groove 31*d* is provided at an end of the tubular body 31 on the first opening 31*a* side. In the shield connector 20, the shield terminal 40 is inserted into the wire insertion path 30*a* from the first opening 31*a* (FIGS. 5 to 8). Therefore, the press-fitting part 41 is fitted into the groove 31*d* from the first opening 31*a* and press-fitted and fixed.

As described above, in the shield connector 20, the shield terminal 40 is press-fitted and fixed to the housing 30 at a place where liquid such as water that has entered the wire insertion path 30*a* from the outside of the shield case 501 is made difficult to enter further by the first seal member 51. That is, in the shield connector 20, the shield terminal 40 is physically and electrically connected to the housing 30 by the press-fitting part 41. Therefore, the shield connector 20 does not need to be provided with a locking structure for holding the housing 30 and the shield terminal 40 with each other between the housing 30 and the shield terminal 40. Therefore, in the wire harness 1, the size of the shield connector 20 can be miniaturized.

Figure 8:
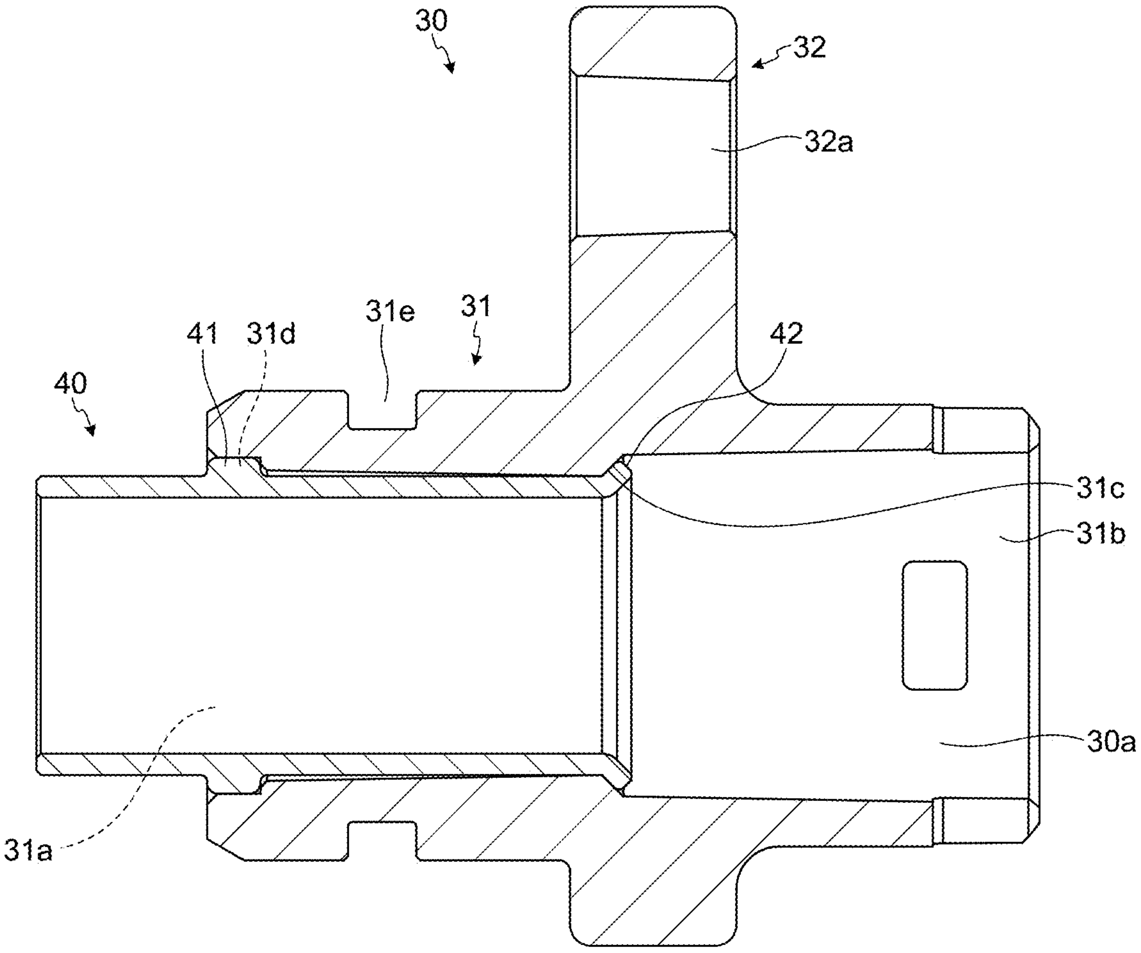
FIG. 8 is a cross-sectional view corresponding to a cross section taken along the line X-X in FIG. 1, and illustrates a state after the flaring processing is performed on the shield terminal.

The locking part 42 is formed as a flared part obtained by expanding an end of the shield terminal 40 on the outer side of the shield case 501 into a flared shape and configured to lock the movement of the shield terminal 40 at the press-fitting completion position from the second opening 31*b* side to the first opening 31*a* side to the locked part 31*c* (FIGS. 3, 4, and 8). Therefore, the outer peripheral surface of the locking part 42 is formed as an annular inclined surface. Therefore, the locked part 31*c* is formed as an annular inclined surface that brings the outer peripheral surface (annular inclined surface) of the flared locking part 42 into surface contact thereto.

Figure 6:
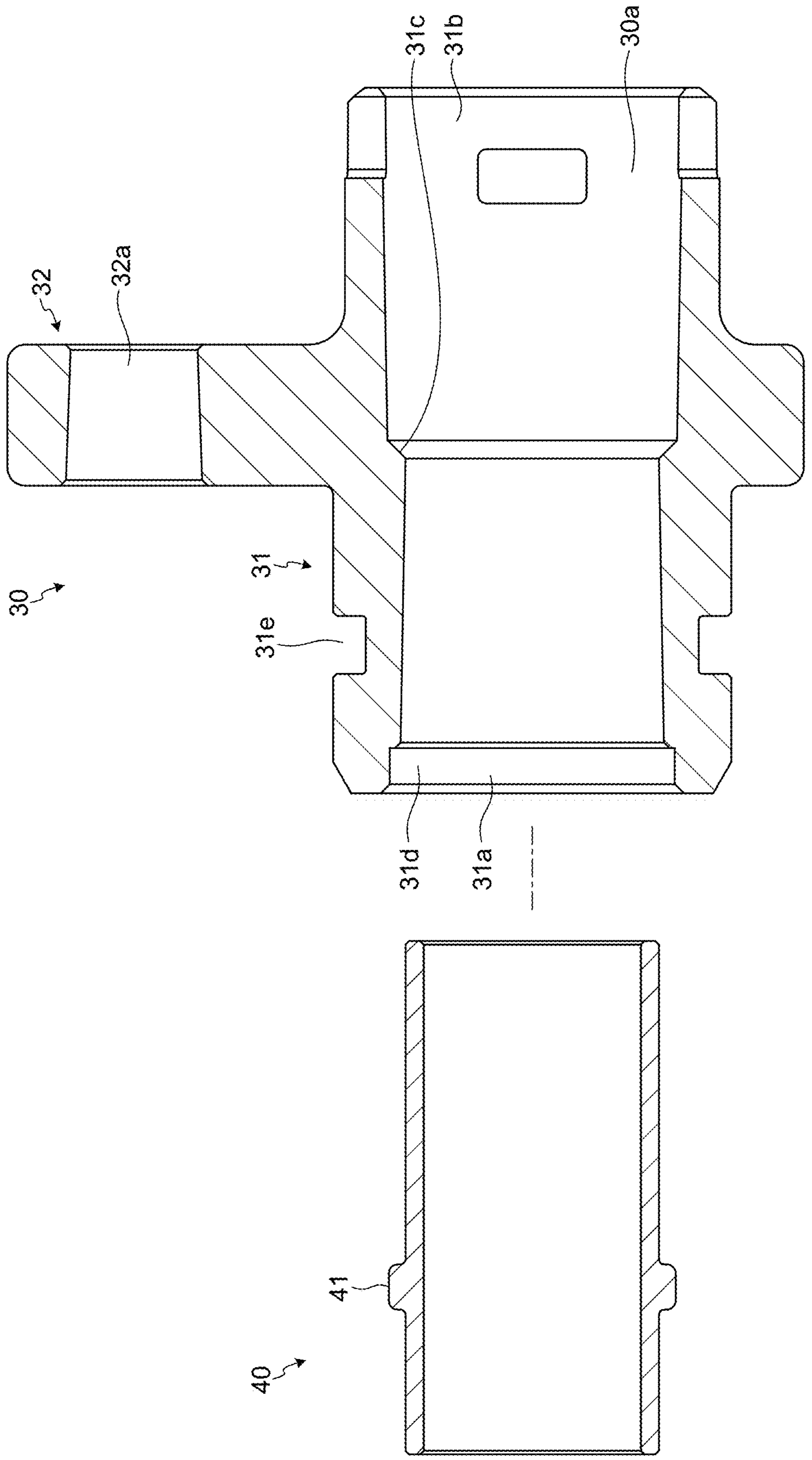
FIG. 6 is a cross-sectional view corresponding to a cross section taken along the line X-X in FIG. 1, and illustrates a state before a shield terminal is press-fitted.
Figure 7:
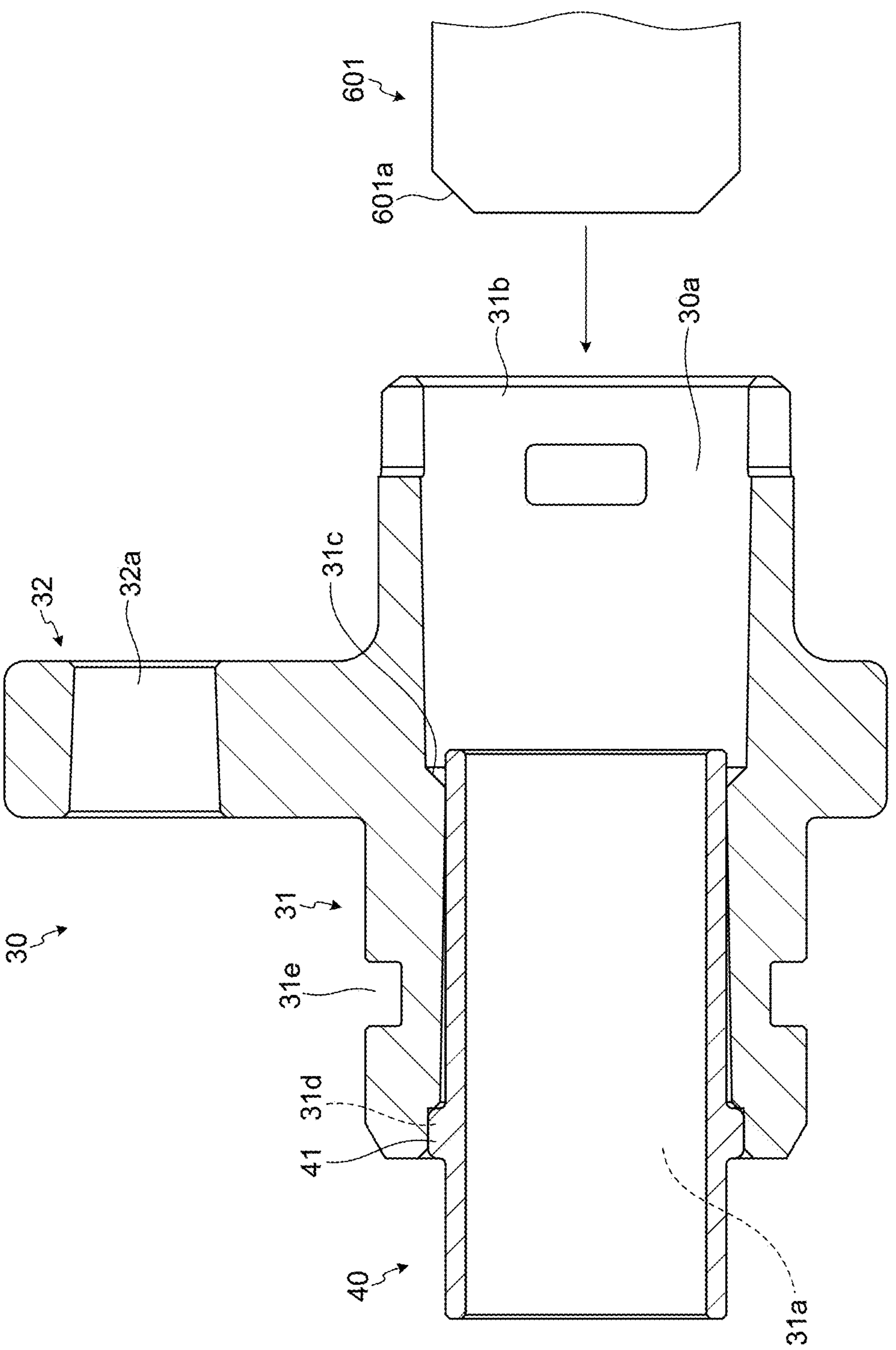
FIG. 7 is a cross-sectional view corresponding to a cross section taken along the line X-X in FIG. 1, and illustrates a state before flaring processing is performed on the shield terminal.

In the shield connector 20, flaring processing for forming the locking part 42 is performed in the housing 30. In the shield connector 20, the shield terminal 40 is inserted into the wire insertion path 30*a* from the first opening 31*a* in a state where the locking part 42 is not formed, and the press-fitting part 41 is press-fitted and fixed to the groove 31*d* (FIGS. 5 to 7). In the shield connector 20, a jig 601 for the flaring processing is inserted into the wire insertion path 30*a* from the second opening 31*b*, and the end of the shield terminal 40 on the outer side of the shield case 501 is expanded into a flared shape by the jig 601 (FIGS. 7 and 8). The jig 601 is formed with an annular inclined surface 601*a* that pushes and expands the end of the shield terminal 40 on the outer side of the shield case 501 in a flared shape from the inner peripheral surface side. The locked part 31*c* illustrated here is also used for the flaring processing. At the time of the flaring processing, the locked part 31*c* sandwiches the end of the shield terminal 40 pushed and expanded by the annular inclined surface 601*a* of the jig 601 with the annular inclined surface 601*a*, and forms the end as a flared locking part 42.

As described above, in the shield connector 20, the locked part 31*c* of the housing 30 and the locking part 42 of the shield terminal 40 can be locked to each other, and the shield terminal 40 can be maintained at the press-fitting completion position of the housing 30. Therefore, in this shield connector 20, even if the holding force between the housing 30 and the shield terminal 40 in the press-fitting structure therebetween decreases due to aging or the like, the detachment of the shield terminal 40 from the housing 30 can be suppressed by the locking structure using the locked part 31*c* and the locking part 42. Furthermore, in the shield connector 20, the locked part 31*c* and the locking part 42 have the locking structure in the constant contact state with each other, and even if the holding force therebetween by the press-fitting structure is reduced and the physical and electrical connection state between the housing 30 and the shield terminal 40 by the press-fitting structure becomes difficult to be secured, the physical and electrical connection state between the housing 30 and the shield terminal 40 can be maintained by between the locked part 31*c* and the locking part 42.

In the shield connector 20, the shielded wire 10 is inserted into the wire insertion path 30*a* from the second opening 31*b*, and the shielded wire 10 is pulled out from the first opening 31*a* through the internal space of the shield terminal 40. At a tip portion of the shielded wire 10 drawn out from the internal space of the shield terminal 40, the shield material 13 is folded and made to concentrically cover the outer peripheral surface of the shield terminal 40. In the shield connector 20, a folded part 13*a* of the shield material 13 is covered by a cylindrical sleeve 61 concentrically from above, and the folded part 13*a* of the shield material 13 is crimped to the outer peripheral surface of the shield terminal 40 together with the sleeve 61 (FIGS. 3 and 4). The sleeve 61 is formed of, for example, the same metal material as the shield material 13 or the same metal material as the shield terminal 40. For example, here, the outer peripheral surface of the sleeve 61 is sandwiched and pressurized by a first mold and a second mold which are not illustrated, and the sleeve 61 is caulked and crimped to the folded part 13*a* of the shield material 13.

In addition, in the shield connector 20, a second seal member 52 is inserted into the wire insertion path 30*a* from the second opening 31*b* together with the shielded wire 10. The shield connector 20 includes a rear holder 71 that holds the second seal member 52 so as not to come out of the second opening 31*b* (FIGS. 3 and 5). The rear holder 71 is formed of an insulating material such as synthetic resin, and is assembled to the tubular body 31 of the housing 30 in a state where the second opening 31*b* is closed.

In the shield connector 20, an annular gap is formed between the outer peripheral surface of the tubular body 31 of the housing 30 and the inner peripheral surface of the through hole 501*c* of the shield wall 501*b*. Therefore, the shield connector 20 includes an annular seal member (hereinafter, referred to as the "second seal member") 52 that prevents liquid such as water outside the shield case 501 from entering into the interior 501*a* of the shield case 501 via the gap between the tubular body 31 and the through hole 501*c* (FIGS. 1 to 5).

The second seal member 52 may be sandwiched between the plane of the large-diameter part of the fixed part 32 and the outer wall surface 501*$b_1$* of the shield wall 501*b* concentrically with the tubular body 31 to enhance the waterproofness farther on the outer side of the shield case 501 than the gap between the tubular body 31 and the through hole 501*c* of the shield wall 501*b*. Alternatively, the second seal member 52 may be disposed in the gap to fill the annular gap between the tubular body 31 and the through hole 501*c* of the shield wall 501*b*. The second seal member 52 illustrated here is a so-called O-ring disposed concentrically with an annular groove 31*e* provided on the outer peripheral surface of the tubular body 31, and fills the gap between the tubular body 31 and the through hole 501*c* of the shield wall 501*b* to enhance the waterproofness (FIGS. 3 to 5). The housing 30 illustrated here forms an annular gap between the outer peripheral surface of the tubular body 31 and the inner peripheral surface of the through hole 501*c* of the shield wall 501*b*. Therefore, the second seal member 52 is formed in an annular shape, and is assembled to the annular groove 31*e* having an annular shape provided on the outer peripheral surface of the tubular body 31.

As described above, in the wire harness 1 according to the present embodiment, because the shield terminal 40 is press-fitted and fixed to the housing 30 at a place where liquid such as water that has entered the wire insertion path 30*a* from the outside of the shield case 501 is made difficult to enter further by the first seal member 51, the contact between dissimilar metals of the shield connector 20 can be prevented at a place exposed to the liquid. Therefore, the wire harness 1 can suppress the occurrence of galvanic corrosion between dissimilar metals in the shield connector 20, and can suppress the occurrence of galvanic corrosion between dissimilar metals between the shield connector 20 and the counterpart shield case 501.

Further, the wire harness 1 according to the present invention is provided with the locking structure in which the locked part 31*c* of the housing 30 and the locking part 42 of the shield terminal 40 are constantly in contact with each other. Therefore, in the wire harness 1, even if the holding force between the housing 30 and the shield terminal 40 in the press-fitting structure therebetween decreases due to aging or the like, the detachment of the shield terminal 40 from the housing 30 can be suppressed while the physical and electrical connection state between the housing 30 and the shield terminal 40 is maintained by the locking structure. Therefore, in the wire harness 1, the contact between dissimilar metals of the shield connector 20 can be prevented for a long time at a place exposed to water or the like, and thus, the durability of the wire harness itself or the counterpart can be improved and the deterioration of the shielding performance can be suppressed.

Figure 9:
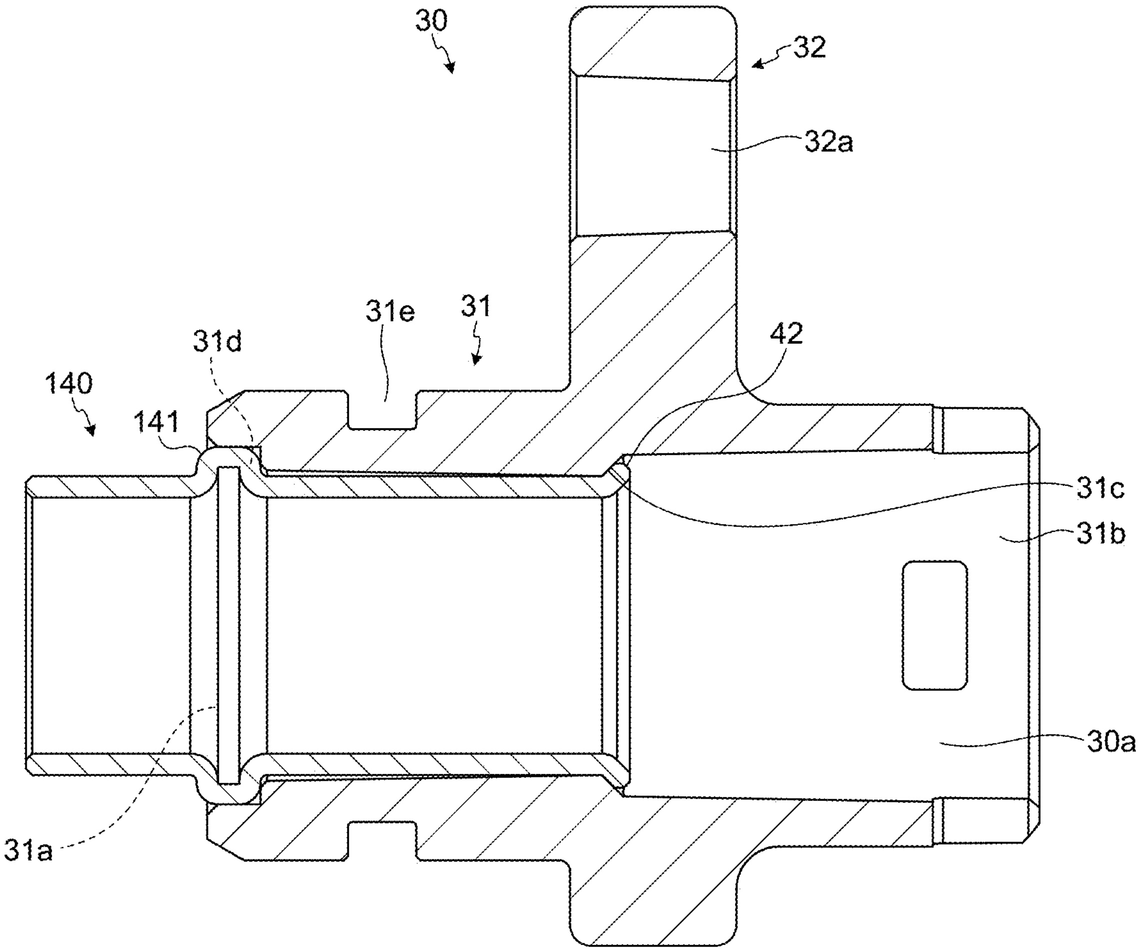
FIG. 9 is a cross-sectional view corresponding to a cross section taken along the line X-X in FIG. 1, and illustrates a modified form of the shield terminal.

Incidentally, in the wire harness 1, the shield terminal 40 may be replaced with a shield terminal 140 described below (FIG. 9). The shield terminal 140 corresponds to the shield terminal 40 in which the press-fitting part 41 is changed to a press-fitting part 141 described below.

Similarly to the press-fitting part 41 described above, the press-fitting part 141 is a portion to be press-fitted and fixed to the tubular body 31 at the press-fitting completion position farther on the interior 501*a* side of the shield case 501 than the first seal member 51 in the wire insertion path 30*a*, and is formed as a protruding part protruding annularly from the outer peripheral surface of the shield terminal 40 over the circumferential direction. The press-fitting part 141 is fitted into the annular groove 31*d* of the tubular body 31 and press-fitted and fixed in the same manner as the press-fitting part 41 described above. However, the press-fitting part 141 illustrated here is a protruding part formed by causing a part of the shield terminal 40 to be pushed out in the tube axis direction from the inner peripheral surface and to be expanded annularly from the outer peripheral surface of the shield terminal 40 over the circumferential direction, and is formed in an annular shape concentric with the shield terminal 40.

The wire harness 1 according to the present embodiment can obtain the same effect as in the case of using the shield terminal 40 even if such a shield terminal 140 is used.

In the wire harness according to the present embodiment, the shield terminal is press-fitted and fixed to the housing at a place where liquid such as water that has entered from the outside of the shield case is difficult to enter by the seal member even in the wire insertion path. Therefore, even if the housing is formed of a metal material having the same ionization tendency as that of the shield case and the shield terminal is formed of another metal material having a different ionization tendency from that of the housing or the shield case, the contact between dissimilar metals of the shield connector can be prevented at a place exposed to liquid. Therefore, the wire harness can suppress the occurrence of galvanic corrosion between the shield terminal and the housing and between the shield terminal and the shield case. Further, the wire harness according to the present embodiment is provided with a locking structure in which the locked part of the housing and the locking part of the shield terminal are constantly in contact with each other. Therefore, in this wire harness, even if the holding force between the housing and the shield terminal in the press-fitting structure therebetween decreases due to aging or the like, the detachment of the shield terminal from the housing can be suppressed while the physical and electrical connection state between the housing and the shield terminal is maintained by the locking structure. Therefore, in the wire harness according to the present embodiment, the contact between dissimilar metals of the shield connector can be prevented for a long time at a place exposed to water or the like, and thus, the durability of the wire harness itself or a counterpart can be improved and the deterioration of the shielding performance can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:

a shielded wire provided with a shield material containing metal;

a housing containing metal, the housing having a tubular body that serves as a wire insertion path through which the shielded wire is inserted and is inserted into a through hole of an outer wall body in a shield case containing metal, and a fixed part that causes the tubular body to be fixed to the outer wall body;

a shield terminal having a tubular shape, the shield terminal being physically and electrically connected to the shield material; and a seal member having an annular shape, the seal member being disposed in the wire insertion path to fill a gap having an annular shape and provided between an inner peripheral surface of the tubular body and an outer peripheral surface of the shielded wire, and preventing liquid that has entered the wire insertion path from an outside of the shield case from entering into an interior of the shield case through the gap, wherein the shield terminal includes a press-fitting part that is press-fitted and fixed to the tubular body at a press-fitting completion position farther on an interior side of the shield case than the seal member in the wire insertion path, and a locking part that causes the shield terminal to be locked to a locked part of the tubular body farther on the interior side of the shield case than the seal member in the wire insertion path while being at the press-fitting completion position.

2. The wire harness according to claim 1, wherein the press-fitting part is formed as a protruding part that protrudes annularly from an outer peripheral surface of the shield terminal over a circumferential direction, and the tubular body has a groove having an annular shape into which the press-fitting part is fitted, and press-fitted and fixed.

3. The wire harness according to claim 1, wherein the press-fitting part is formed as a protruding part that protrudes annularly from an outer peripheral surface of the shield terminal over a circumferential direction, the tubular body includes a first opening disposed on an interior side of the shield case, a second opening disposed on an outer side of the shield case, and a groove having an annular shape into which the press-fitting part is fitted from the first opening and is press-fitted and fixed, and the locking part is formed as a flared part obtained by expanding an end of the shield terminal on an outer side of the shield case into a flare shape and configured to lock movement of the shield terminal at the press-fitting completion position to the locked part, the movement acting from a side of the second opening to a side of the first opening.

* * * * *